United States Patent
Psiuk et al.

(10) Patent No.: US 11,156,490 B2
(45) Date of Patent: Oct. 26, 2021

(54) METHOD AND APPARATUS FOR DETERMINING A FILL LEVEL OF A STORAGE CONTAINER

(71) Applicant: Fraunhofer-Gesellschaft zur Foerderung der angewandten Forschung e.V., Munich (DE)

(72) Inventors: Rafael Psiuk, Erlangen (DE); Mathis Huther, Erlangen (DE); Tobias Draeger, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/618,187

(22) PCT Filed: May 17, 2018

(86) PCT No.: PCT/EP2018/062972
§ 371 (c)(1),
(2) Date: Nov. 29, 2019

(87) PCT Pub. No.: WO2018/219678
PCT Pub. Date: Dec. 6, 2018

(65) Prior Publication Data
US 2020/0209042 A1 Jul. 2, 2020

(30) Foreign Application Priority Data

May 30, 2017 (DE) .......................... 102017111722.9

(51) Int. Cl.
*G01V 3/10* (2006.01)
*G01F 23/26* (2006.01)

(52) U.S. Cl.
CPC .............. *G01F 23/26* (2013.01); *G01V 3/101* (2013.01)

(58) Field of Classification Search
CPC .......... G01F 23/26; G01V 3/101; G01V 3/08; G01N 27/72
See application file for complete search history.

(56) References Cited

U.S. PATENT DOCUMENTS

| 5,028,870 A | 7/1991 | Reed |
| 5,103,893 A * | 4/1992 | Naganuma .............. G01F 23/26 164/451 |

(Continued)

FOREIGN PATENT DOCUMENTS

| DE | 3802121 A1 | 8/1989 |
| DE | 6891453712 T2 | 1/1990 |

(Continued)

OTHER PUBLICATIONS

"Simple Phenomenological Models for Wideband Frequency-Domain Electromagnetic Induction", Jonathan T. Miller et al.

(Continued)

*Primary Examiner* — Daniel R Miller
(74) *Attorney, Agent, or Firm* — 2SPL Patent Attorneys PartG mbB; Yong Beom Hwang (57) ABSTRACT

A method for determining a filling level of a storage container is disclosed. The method comprises generating a magnetic exciter field. The magnetic exciter field is configured to excite a content of the storage container to form a magnetic response field. The method further comprises determining at least one measurement value for the magnetic response field. The method further comprises determining the filling level of the storage container based on a position of the storage container and comparing the at least one measurement value with reference measurement values. One filling level of the storage container is assigned to each of the reference measurement values.

10 Claims, 4 Drawing Sheets

(56) References Cited

U.S. PATENT DOCUMENTS

| | | | |
|---|---|---|---|
| 6,418,787 B1* | 7/2002 | Eck | G01F 23/2963 |
| | | | 367/87 |
| 6,517,604 B1* | 2/2003 | Kim | B22D 2/003 |
| | | | 164/450.5 |
| 6,879,161 B2 | 4/2005 | Rowan | |
| 2002/0156557 A1 | 10/2002 | Gras | |
| 2003/0090266 A1 | 5/2003 | Kesil et al. | |
| 2003/0122675 A1 | 7/2003 | Engdahl et al. | |
| 2003/0213299 A1* | 11/2003 | Arndt | G01F 23/284 |
| | | | 73/290 V |
| 2005/0007239 A1 | 1/2005 | Woodard et al. | |
| 2006/0053880 A1* | 3/2006 | Taylor | G01F 23/263 |
| | | | 73/304 C |
| 2007/0157718 A1* | 7/2007 | Woodard | G01F 23/268 |
| | | | 73/149 |
| 2008/0074109 A1 | 3/2008 | Tsukada et al. | |
| 2013/0010298 A1* | 1/2013 | Antonacci | G01N 21/59 |
| | | | 356/434 |
| 2013/0147465 A1* | 6/2013 | Ciani | B22D 2/003 |
| | | | 324/204 |
| 2013/0338953 A1 | 12/2013 | Derungs | |

FOREIGN PATENT DOCUMENTS

| | | |
|---|---|---|
| WO | 8803273 A1 | 5/1988 |
| WO | 0000848 A1 | 1/2000 |
| WO | 0024535 A1 | 5/2000 |
| WO | 2005043195 A1 | 5/2005 |
| WO | 2008089302 A1 | 7/2008 |
| WO | 2008101270 A1 | 8/2008 |
| WO | 2013188443 A1 | 12/2013 |
| WO | 2015061642 A1 | 4/2015 |

OTHER PUBLICATIONS

"Fast and Accurate Calculation of Physically Complete EMI Response by a Heterogeneous Metallic Object", Fridon Shubitidze et al.

* cited by examiner

METHOD AND APPARATUS FOR DETERMINING A FILL LEVEL OF A STORAGE CONTAINER

TECHNICAL FIELD

Embodiments deal with the characterization of objects by means of magnetic fields. In particular, embodiments relate to a method and a device for determining a filling level of a storage container.

BACKGROUND

In the field of logistics, objects are often transported in storage containers that must not be opened or cannot be opened non-destructively. Checking the contents of the storage container may therefore sometimes be cost and time consuming or even impossible. It may also be of interest to know the exact filling quantity of a storage container and/or to know the composition of the contents of the storage container.

In general, it may be of interest to know the material composition of an object or at least of parts thereof in order to compare same with manufacturer or supplier information, for example.

In the food industry, it is further essential to ensure that no foreign substances (e.g. metal parts) have entered the food during the manufacturing process.

It is thus the object to provide a possibility for characterising an object.

SUMMARY

Embodiments of a method for determining a filling level of a storage container solve this object. The method comprises generating a magnetic exciter field. The magnetic exciter field is configured to excite a content of the storage container to form a magnetic response field. The method further comprises determining at least one measurement value for the magnetic response field. The method further comprises determining the filling level of the storage container based on a position of the storage container and comparing the at least one measurement value with reference measurement values. One filling level of the storage container is assigned to each of the reference measurement values.

Further embodiments relate to a device for determining a filling level of a storage container. The device includes an exciter module configured to generate a magnetic exciter field. The magnetic exciter field is configured to excite a content of the storage container to form a magnetic response field. The device further comprises a measurement module configured to determine at least one measurement value for the magnetic response field. The device further comprises an evaluation module configured to determine the filling level of the storage container based on a position of the storage container and a comparison of the at least one measurement value with reference measurement values. One filling level of the storage container is assigned to each of the reference measurement values.

BRIEF DESCRIPTION OF THE FIGURES

Embodiments are explained in more detail with reference to the accompanying Figures, in which.

DESCRIPTION

Various embodiments will now be described with reference to the accompanying drawings in which some example embodiments are illustrated. In the Figures, the thicknesses of lines, layers and/or regions may be exaggerated for clarity.

In the following description of the accompanying figures, which only show a few exemplary embodiments, like references may designate like or comparable components. Moreover, summarizing references may be used for components and objects that occur more than once in an embodiment or in a drawing, but are described together with regard to one or more features. Components or objects which are described with like or summarizing references may be identical with regard to individual, several or all features, for example their dimensioning, but may also be designed differently, provided that the description does not explicitly or implicitly state otherwise.

Although embodiments may be modified and altered in various ways, embodiments are illustrated as examples in the figures and are described in detail herein. However, it should be made clear that it is not the intention to limit embodiments to the respective forms disclosed, but rather that embodiments should cover all functional and/or structural modifications, equivalents and alternatives that lie within the scope of the invention. Like references refer to like or similar elements throughout the description of the figures.

It is noted, that an element which is referred to a being "connected" or "coupled" to another element, may be directly connected or coupled to the other element or that intervening elements may be present.

The terminology used herein only serves for the description of specific embodiments and should not limit the embodiments. As used herein, the singular form such as "a," "an" and "the" also include the plural forms, as long as the context does not indicate otherwise. It will be further understood that the terms e.g. "comprises," "comprising," "includes" and/or "including," as used herein, specify the presence of the stated features, integers, steps, operations, elements and/or components, but do not preclude the presence or addition of one and/or more other features, integers, steps, operations, elements, components and/or any group thereof.

Unless otherwise defined, all terms (including technical and scientific terms) are used herein in their ordinary meaning of the art to which the examples belong and given to same by a person of ordinary skill in the art. It is further clarified that terms like e.g. those defined ion generally used dictionaries are to be interpreted to have the meaning consistent with the meaning in the context of relevant technology, as long as it is not expressly defined otherwise herein.

Figure 1:
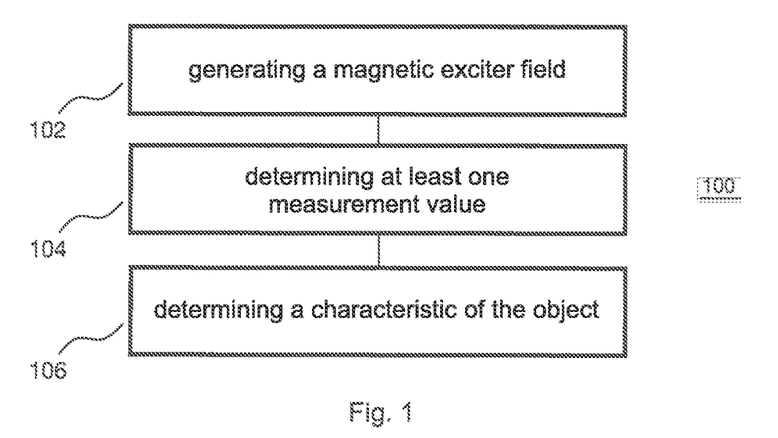
FIG. 1 shows a flow chart of an embodiment of a method for characterizing an object.

FIG. 1 shows a method 100 for characterizing an object. The method 100 comprises generating 102 a magnetic exciter field. The magnetic exciter field is configured to excite the object for forming a magnetic response field. The method 100 further comprises determining 104 at least one measurement value for the magnetic response field. Further, the method 100 comprises determining 106 a characteristic of the object based on a position of the object and a comparison of the at least one measurement value with reference measurement values. Here, one characteristic of the object is assigned to each of the reference measurement values.

The method 100 may enable a non-invasive characterization of the object. The magnetic response field is characteristic of an object (e.g. due to its shape, composition or orientation). From the (known) position of the object, the distance of the object to the measuring position for the magnetic response field and/or to a position of the generation of the magnetic exciter field may be determined. The distance of the object to these two positions influences the magnetic response field formed by the object and the measurement value of same. Taking into account the position of the object, the characteristic of the object may be determined based on the reference measurement values without having to open, dismantle, damage and/or destroy the object. In addition, a complex manual characterization of the object may be omitted, so that the characterization of the object is possible in real time.

The object may be any object which may form and/or generate a magnetic response field in reaction to a magnetic exciter field. For example, an object may be an electrically conductive and/or magnetically permeable object. The object may consist of or be assembled from one or more sub-objects or components. The sub-objects may be identical or also different from each other. The object may be an object which may as such form and/or generate a magnetic response field in response to a magnetic exciter field, and also an object comprising a component (element, device) or coupled to same which may form and/or generate a magnetic response field in response to a magnetic exciter field. For example, the object may be a screw, a piece of metal, or the contents of a storage container.

The magnetic exciter field may be any magnetic field which may excite the object to develop a magnetic response field. For example, the magnetic exciter field may be an alternating magnetic field. An alternating magnetic field may for example be generated by means of coils or conductor loops through which AC current flows. The magnetic exciter field may here include one or several frequency components. Further, a frequency of the magnetic exciter field may vary.

The at least one measurement value for the magnetic response field represents the state of the magnetic response field at a predetermined measurement position. For example, the at least one measurement value may indicate the amplitude and/or phase of the response field at the predetermined measurement position. Based on a desired accuracy of the characteristic of the object to be determined, the number of measurement points may be selected. For example, the magnetic response field may be measured at two, three, four, five or more different positions. Not only the amplitude and phase of the magnetic response field may be measured here, but also the individual field components (i.e. in x, y, and z direction) to thus determine a field vector at the measurement position. In order to measure the magnetic response field, e.g. one or several receive antennae may be arranged at a respective measurement position. A voltage induced in the receive antenna is here proportional to the local amplitude and/or phase of the magnetic response field at the measurement position. Alternatively, e.g. also a Hall sensor or any other suitable magnetometer may be used to determine the at least one measurement value for the magnetic response field.

The reference measurement values may be obtained e.g. by reference measurements on an object with a certain characteristic. Alternatively or additionally, reference measurement values may also be obtained by simulating the behavior of an object with a specific characteristic in the magnetic exciter field. Further, information on a distance of the object of the reference measurement/simulation to the measurement position for the magnetic response field and/or to a position of the generation of the magnetic exciter field in the reference measurement/simulation may be assigned to the reference measurement values. In this way, the position of the object during the measurement may be correlated with the position of the object in the reference measurements. For example, based on a correlation of the positions, the measurement value and/or the reference measurement values may be scaled and the scaled value(s) may then be compared.

If the object is the contents of a storage container, the characteristic of the object may be, for example, a filling level of the storage container. The storage container may be any container that may be penetrated by both the magnetic exciter field and the magnetic response field. The storage container may be suitable for holding solids, liquids and also gases, so that the object may be a solid, a liquid or a gas. The storage container may both be open and also closed. Furthermore, the storage container may be opened non-destructively or only by destroying it.

Also, the characteristic of the object may be a type of object. For example, the type of object may indicate which object it is (e.g. screw, metal sheet, accumulator), which shape (geometry) the object has (long, short, large, small, round, angular, flat, solid body, hollow body etc.), which material(s) the object is made of (e.g. a certain metal). The above-mentioned characteristics each cause a characteristic magnetic response field of the object. If the object is e.g. located in a storage container, the contents of the storage container may be characterized non-invasively, i.e. without having to open or destroy the storage container.

The characteristic of the object may also be a composition of the object. The composition of the object shows, for example, which material(s) the object is made of or what proportion of the object the materials have. For example, different alloys form different characteristic magnetic response fields. From the measured magnetic response field, a certain alloy may therefore be inferred. If the object is made up of sub-objects, the characteristic of the object may indicate whether the sub-objects are identical or different, since the sub-objects each form a characteristic magnetic response field. If, for example, the object is the contents of a storage container, it may be determined in this way whether identical or different (and which) objects are located in the storage container without having to open or destroy the storage container.

The characteristic of the object may also be an orientation of the object (standing, lying, in the right/wrong position, etc.). Depending on the orientation of the object, the object generates different magnetic response fields. From the measured magnetic response field, the orientation of the object may therefore be inferred. If the object is located in a storage container, for example, the orientation of the object in the storage container may be inferred without having to open or destroy the storage container. If the object in the storage container consists of several sub-objects, each of these sub-objects forms a characteristic magnetic response field depending on its orientation. From the measured magnetic response fields of the sub-objects, the alignment of the sub-objects may therefore be inferred. For example, it may be determined, whether all sub-objects in the storage container are aligned in the same way. For example, it may thus be determined, whether one or more sub-objects have tipped over in the storage container.

The magnetic response field of an object is determined to a large extent by near-surface areas (inside) of the object, i.e. in particular by a coating of the object. Differently thick coatings of the object thus generate different magnetic response fields, which are characteristic for the respective thickness of the coating. Since the forming of the magnetic response field is determined in particular by areas close to the surface (inside) of the object, the characteristic may also be the thickness of a coating of the object. The magnetic exciter field here excites the coating for forming the magnetic response field. The thickness of the coating may be determined non-invasively and in real time on the basis of the comparison of the at least one measurement value with reference measurement values, to each of which one thickness of the coating is assigned.

The comparison of the at least one measurement value for the magnetic response field with reference measurement values may e.g. be done by a comparison of the measurement value with reference measurement values stored in a table. In this respect, e.g. a similarity or match between the measurement value and the reference measurement values may be determined. Based on the comparison results, for example, the characteristic assigned to a reference value may be determined as the characteristic of the object. A reference value and its assigned characteristic may e.g. be stored as a 2-tuple in a table. Further, several characteristics may also be assigned to a reference value. Accordingly, the comparison of the plurality of measurement values to reference measurement values may e.g. include searching a table.

Determining the similarity of the at least one measurement value to one of the reference measurement values may here include comparing an amplitude of the measurement value with an amplitude of one of the reference measurement values. Alternatively or in addition, determining the similarity of the at least one measurement value to one of the reference measurement values may include comparing a phase of the measurement value with a phase of one of the reference measurement values. Different objects (e.g. different contents of a storage container) each generate characteristic phase positions of the magnetic response field. For example, short screws generate a different phase position than long screws. The amplitude of the magnetic response field also depends on the mass and/or quantity of the object. If the object is a certain bulk material in a storage container, the magnetic response field has a lower amplitude, for example, for a storage container filled to a quarter with the bulk material than for a storage container filled to a half with the bulk material. By comparing the phase and/or amplitude of the measurement value with the phase and/or amplitude of the reference measurement values, the contents of the storage container may be characterized. For example, it may also be determined whether a storage container includes short screws or long screws/large or small balls/large-area or small-area sheet metal etc.

As already indicated above, generating 102 the magnetic exciter field may include varying a frequency of the magnetic exciter field. For example, one or more predetermined frequency ranges may be passed. In order to vary the frequency of the magnetic exciter field, the frequency of the current in alternating current coils or conductor loops, for example, may be varied.

Determining 104 at least one measurement value for the magnetic response field may then correspondingly comprise determining a plurality of measurement values for the magnetic response field for different frequencies of the magnetic exciter field. This means that one or more measurement values for the magnetic response field may be determined for different frequencies of the magnetic exciter field. Determining 106 the characteristic of the object may then comprise determining a phase response and/or an amplitude response of the plurality of measurement values across the different frequencies of the magnetic exciter field. The course and/or response of the phase and/or amplitude of the magnetic response field is characteristic for an object. Different objects characterize magnetic response fields with different phase courses/responses across the different frequencies of the magnetic exciter field. Accordingly, determining 106 the characteristic of the object may include determining the similarity of the phase response and/or the amplitude response of the plurality of measurement values to a phase response and/or an amplitude response of at least a part of the reference measurement values across the different frequencies of the magnetic exciter field. By comparing the measured phase and/or amplitude response with the reference phase and/or reference amplitude responses, a characteristic may be assigned to the object with increased accuracy/robustness. For example, the type of object (such as the contents of a storage container) or the composition of the object (such as the contents of a storage container) may be determined in this way. With reference to the above screw example, it may thus be determined, for example, whether the storage container contains short or long screws, and/or in what proportion the storage container contains short and long screws.

Determining 104 the at least one measurement value for the magnetic response field may then also include determining a plurality of measurement values for the magnetic response field for different orientations of the object relative to the magnetic exciter field. For example, the object may for this purpose be rotated in a stationary magnetic exciter field. Alternatively, the orientation of the magnetic exciter field may be rotated. For this purpose, the magnetic exciter field may be generated e.g. by a plurality of coils arranged orthogonally to each other. The spatial orientation of the magnetic exciter field relative to the object may be changed (e.g. the magnetic exciter field may be rotated) by controlling the majority of coils accordingly. Alternatively, the generator of the magnetic exciter field may be moved relative to the object. Determining 106 the characteristic of the object then includes determining the characteristic of the object based on a comparison of the plurality of measurement values with the reference measurement values. The magnetic response field of an object depends on its relative orientation with respect to the magnetic exciter field. Accordingly, by evaluating the plurality of measurement values for different orientations of the storage container relative to the magnetic exciter field, the orientation of the contents of the storage container may be determined. If the object consists of several like sub-objects, it may thus also be determined, for example, whether the sub-objects are all aligned in the same way or differently.

In the above example, the control of the plurality of coils may be based on the position of the object, i.e. based on a spatial distance of the object to the generator (exciter module) of the magnetic exciter field and/or a spatial distance of the storage container to the measurement position (measurement module) of the magnetic response field for determining the measurement value of the magnetic response field. By including the position of the object relative to the generation position of the magnetic exciter field and/or the measurement position of the magnetic response field, the switching complexity for rotating the magnetic exciter field may be reduced.

The spatial orientation of the magnetic exciter field relative to the storage container may be changed (e.g. the magnetic exciter field may be rotated) by accordingly controlling the majority of coils.

To the enable characterization of the object, the object may be provided with a material that interacts with the magnetic exciter field in a predetermined manner to indicate a predetermined characteristic of the object. For example, the object may be coated with a layer of a specific electrically conductive or magnetically permeable material, or corresponding particles may be added to a layer of the object. For example, particles of certain electrically conductive or magnetically permeable materials may be added to the varnish layer of an object in a storage container to encode the color of the varnish layer. Alternatively, an object may also be coupled to an element (e.g. tag, sticker, other element made of this material) to encode a characteristic of the object (e.g. owner, sender, recipient, color). For example, a predetermined amount of a certain electrically conductive or magnetically permeable material may be added to the contents of a storage container to encode a characteristic of the contents (i.e. the object).

Figure 2:
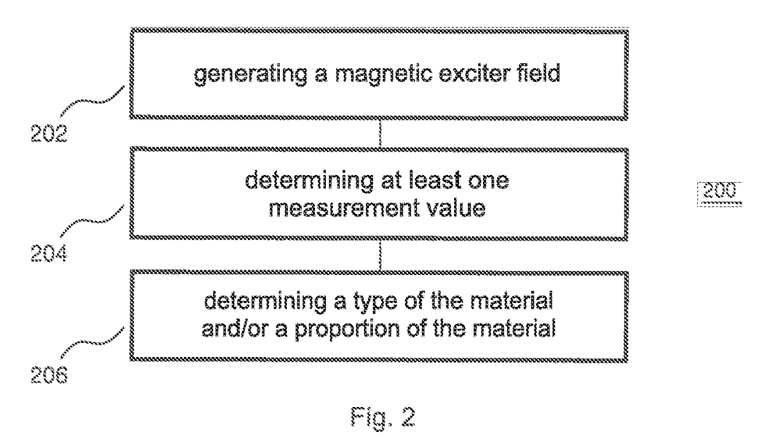
FIG. 2 shows a flow chart of an embodiment of a method for determining a composition of an object.

Furthermore, the material composition of an object may also be determined according to the proposed concept. A method 200 for determining a composition of an object is shown in FIG. 2. The method 200 comprises generating 202 a magnetic exciter field. The magnetic exciter field is configured here to excite a material of the object for forming a magnetic response field. Further, the method 200 comprises determining 204 at least one measurement value for the magnetic response field. The method 200 further comprises determining 206 a type of material and/or a proportion of the material with respect to the object based on a comparison of the at least one measurement value with reference measurement values. A type of material and/or a proportion of the material in the object are respectively assigned to the reference measurement values.

Different materials generate different magnetic response fields in the presence of a magnetic exciter field. This behavior is used by method 200 to determine/acknowledge the presence of a material in/at the object. In this way, the material composition of the object may be determined.

The magnetic exciter field may be any magnetic field which may excite the material to develop a magnetic response field. In particular, the frequency of the magnetic exciter field may be varied. It goes without saying that one or more measurement values for the magnetic response field may be determined accordingly for the different frequencies of the magnetic exciter field. From these, a phase response and/or an amplitude response of the magnetic response field may be determined, which may be compared with reference phase and/or reference amplitude responses, as already described for method 100. In general, the comparison of the at least one measurement value with the reference measurement values may be made according to the principles shown in connection with method 100. In order to avoid repetitions, please refer to the above comments on method 100.

To determine the composition of the object, the position of the object may optionally be taken into account, as explained above in connection with method 100.

The reference measurement values may in turn be determined using reference measurements or using a simulation.

For example, the composition of an alloy may be tested using method 200. The individual metals of the alloy exhibit a characteristic phase behavior with regard to the magnetic response field (e.g. a characteristic phase response), which may be used to determine the type of metal. The proportion of metal in the alloy further influences the amplitude behavior of the magnetic response field (e.g. amplitude response). The amplitude behavior may then be used to infer the proportion of the metal in the alloy.

By providing the reference measurement values, to which the type of material and/or the proportion of material in the object is assigned, the material composition of the object may be determined non-invasively and in real time using the method 200.

Figure 3:
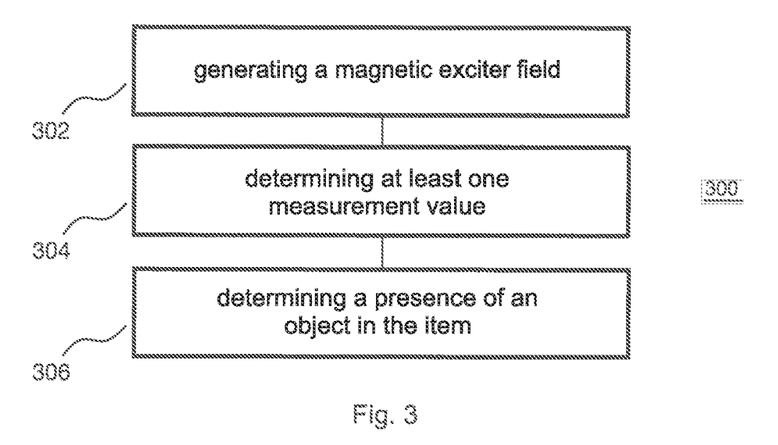
FIG. 3 shows a flow chart of an embodiment of a method for detecting an electrically conductive and/or magnetically permeable object in an item.

Furthermore, the proposed concept may also be used to detect electrically conductive and/or magnetically permeable objects (e.g. metallic objects) in an item. In particular, using the proposed concept metallic items in food may be detected. A corresponding method 300 for detecting an electrically conductive and/or magnetically permeable object in an item is shown in FIG. 3. The method 300 comprises generating 302 a magnetic exciter field. The magnetic exciter field is configured here to excite an electrically conductive and/or magnetically permeable object in the item to form a magnetic response field. The method 300 further comprises determining 304 at least one measurement value for the magnetic response field. The method 300 further comprises determining 306 the presence of an electrically conductive and/or magnetically permeable object in the item based on a comparison of the at least one measurement value with reference measurement values. The reference measurement values here respectively indicate the presence of an electrically conductive and/or magnetically permeable object.

The magnetic response field of the item is different in the presence or absence of an electrically conductive and/or magnetically permeable object in the item. Accordingly, the comparison with the reference measurement values allows non-invasive and real-time determination of whether the item contains an electrically conductive and/or magnetically permeable object. The method 300 thus enables simple testing for the presence of metallic objects in an item.

The magnetic exciter field may here be any magnetic field which may excite an electrically conductive and/or magnetically permeable object to develop a magnetic response field. In particular, the frequency of the magnetic exciter field may in turn be varied. It goes without saying that one or more measurement values for the magnetic response field may be determined accordingly for the different frequencies of the magnetic exciter field. From these, a phase response and/or an amplitude response of the magnetic response field may be determined, which may be compared with reference phase and/or reference amplitude responses, as already described for method 100. In general, the comparison of the at least one measurement value with the reference measurement values may be made according to the principles shown in connection with method 100. In order to avoid repetitions, please refer to the above comments on method 100.

The reference measurement values may also be determined using reference measurements or using a simulation.

To determine the presence of an electrically conductive and/or magnetically permeable object in the item, the position of the item may optionally be taken into account, as explained above in connection with method 100.

As indicated above, the object may be a type of food, for example. In this way, for example, during an intermediate or final inspection in a food production plant, it may be easily checked whether metal parts (e.g. from production plants) have gotten into the food during the (previous) manufacturing process. Since the method 300 enables non-invasive testing, it is also possible to test food that has already been packaged (e.g. also by a salesperson or intermediary of the food).

Devices for executing the procedures described above are described in more detail below with reference to the FIGS. 4 to 7.

Figure 4:
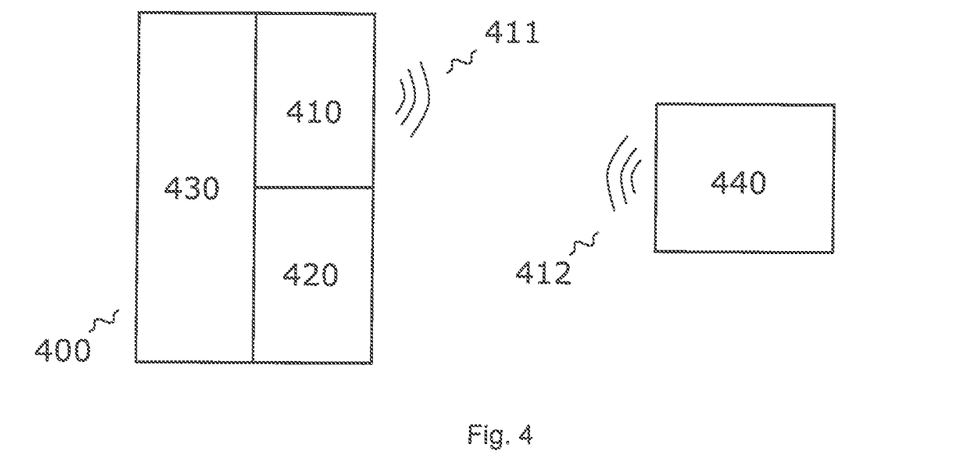
FIG. 4 shows an embodiment of a device for characterizing an object.

Here, FIG. 4 shows a device 400 for characterizing an object 440. The device 400 includes an exciter module 410 configured to generate a magnetic exciter field 411. The magnetic exciter field 411 is configured to excite the object 440 for forming a magnetic response field 412. The device 400 further comprises a measurement module 420 configured to determine at least one measurement value for the magnetic response field 412. Further, the device 400 comprises an evaluation module 430 configured to determine a characteristic of the object 440 based on a position of the object 440 and a comparison of the at least one measurement value with reference measurement values. Here, one characteristic of the object 440 is assigned to each of the reference measurement values.

The device 400 may enable a non-invasive characterization of the object 440. Taking into account the position of the object 440, the characteristic of the object 440 may be determined based on the reference measurement values without having to open, dismantle, damage and/or destroy the object 440. In addition, a complex manual characterization of the object 440 may be omitted, so that the characterization of the object 440 is possible in real time.

If the object 440 is the contents of a storage container, for example, using the device 400 a filling level of the storage container may be determined. Further, also a type of the object 440 (which object, which material, which shape, etc.), a composition of the object 440 (e.g. proportions of different sub-objects or materials in the object 440) or an orientation of object 440 (standing, lying, sub-objects identically oriented, etc.) may be determined.

As already indicated above, the object 440 may be any object which may develop and/or generate a magnetic response field in reaction to the magnetic exciter field 411.

The exciter module 410 may here be configured to generate the magnetic exciter field 411 according to the above described principles and develop same in its environment. In particular, in this respect the exciter module 410 may include one or several coils, one or several conductor loops and/or one or more coil systems through which an electric current flows.

The measurement module 420 may here be configured to receive the magnetic response field 412 according to the above described principles and determine the at least one measurement value for the magnetic response field 412. In particular, the measurement module 420 may include one or several receive antennas arranged at one or several predetermined measurement positions. Here, at the one or several of the plurality of predetermined measurement positions both a single measurement antenna and also several measurement antennas may be arranged. Alternatively, the measurement module 420 may e.g. also include one or more Hall sensors or any other suitable magnetometer to determine the at least one measurement value for the magnetic response field. The measurement module 420 may further include one or several suitable read-out electronic(s) to prepare the signals measured by the receive antenna(s) for further processing by the evaluation module 430. For example, a readout electronics may filter, amplify, (complex) mix and/or digitize measured signals.

The evaluation module 430 may here be configured to determine the characteristic of the object 440 according to the above described principles from the position of the object 440, the at least one measurement value and the reference measurement values. The evaluation module may for example comprise a processor, a Central Processing Unit (CPU), a Graphics Processing Unit (GPU), a computer, a computer system, an Application-Specific Integrated Circuit (ASIC), an Integrated Circuit (IC), a System on a Chip (SoC), a programmable logics element or a Field Programmable Gate Array (FPGA) comprising a microprocessor on which software for controlling the evaluation module 430 is run according to the above principles. Further, the evaluation module 430 may comprise one or several memories in which e.g. software for controlling the evaluation module 430, the reference measurement values or other data may be stored.

The position of the object 440 may be determined e.g. by a measuring device (not shown) of device 400. The measuring device may here use any suitable measurement technique (e.g. laser, radar, image evaluation, etc.).

For example, the exciter module 410 may be configured to vary a frequency of the magnetic exciter field 411. Further, the measurement module 420 may be configured to determine a plurality of measurement values for the magnetic response field 412 for different frequencies of the magnetic exciter field 411. The evaluation module 430 may further be configured to determine a phase response and/or an amplitude response of the plurality of measurement values across the different frequencies of the magnetic exciter field 411 and to determine a similarity of the phase response and/or the amplitude response of the plurality of measurement values to a phase response and/or an amplitude response of at least a part of the reference measurement values across the different frequencies of the magnetic exciter field 411. By comparing the measured phase and/or amplitude response with the reference phase and/or reference amplitude responses, a characteristic may be assigned to the object with increased accuracy/robustness. For example, the type of the object 440, or the composition of the object 440 may be determined in this way. With reference to the above screw example, it may thus be determined, for example, whether a storage container contains short or long screws, and/or in what proportion the storage container contains short and long screws.

Further, the device 400 may be configured to move the exciter module 410 and the measurement module 420 relative to the object 440. Alternatively, the exciter module 410 may comprise a plurality of coils arranged orthogonally to each other and a control circuit. The control circuit is arranged here to drive the plurality of coils to change a spatial orientation of the magnetic exciter field 411 relative to the object 440 (e.g. to rotate the magnetic exciter field 411 relative to the object 440). The measurement module 420 is then configured to determine a plurality of measurement values for the magnetic response field 412 for different orientations of the object 440 relative to the magnetic exciter field 411. Here, the evaluation module 430 is configured to determine the characteristic of the object 440 based on a comparison of the plurality of measurement values with the reference measurement values. The magnetic response field of the object 440 depends on its relative orientation with respect to the magnetic exciter field 411. Accordingly, by evaluating the plurality of measurement values for different orientations of the object 440 relative to the magnetic exciter field 411, the orientation of the object 440 may be determined. If the object 440 consists of several like sub-objects, it may thus also be determined, for example, whether the sub-objects are all aligned in the same way or differently.

As already indicated above, the magnetic response field 411 is determined in particular by near-surface regions (inside) of the object 440. The device 400 may therefore also be used to determine a thickness of a coating of the object 440 according to the above principles.

Figure 5:
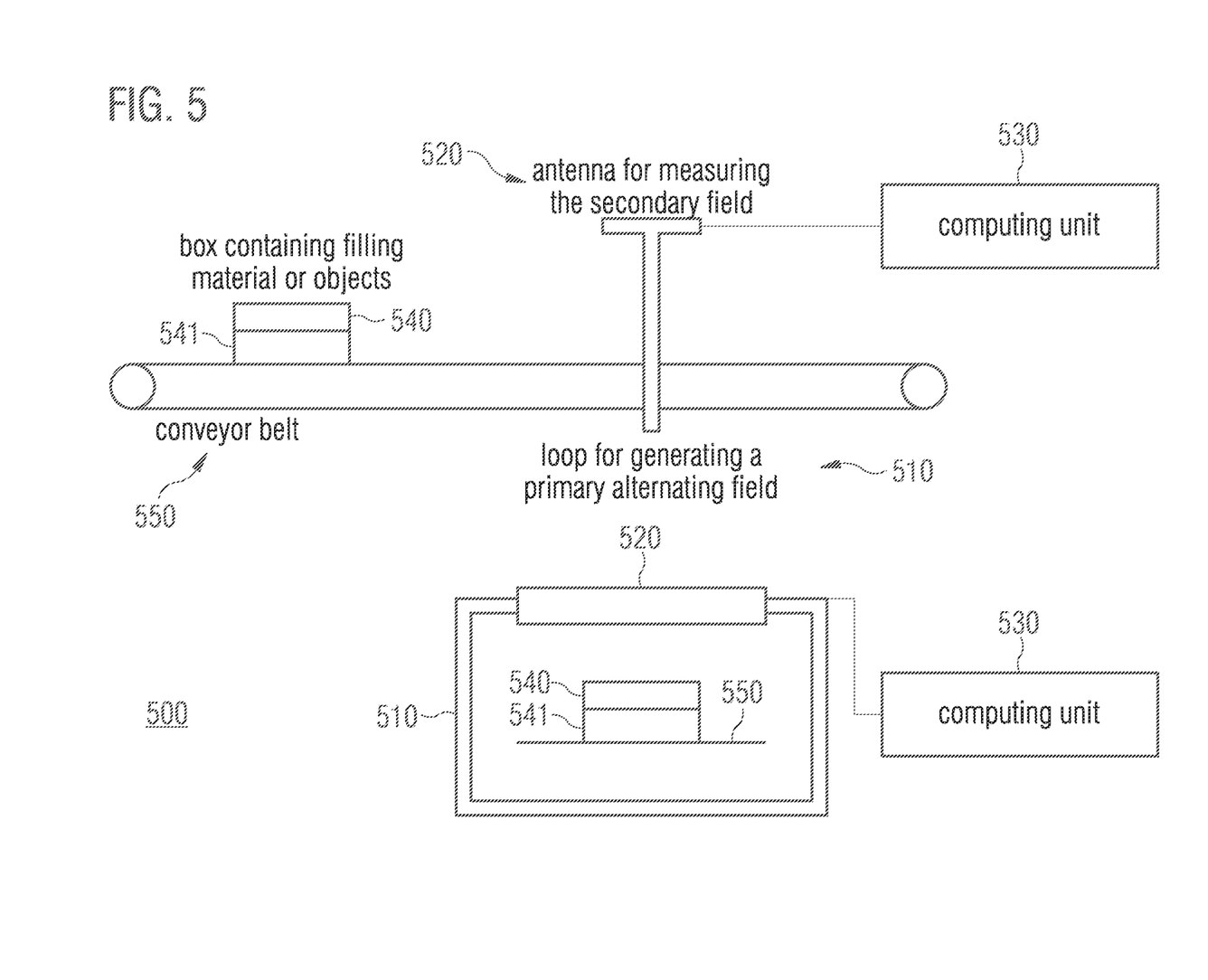
FIG. 5 shows a further embodiment of a device for characterizing an object.

More details and aspects of the device 400 and the object 440 are described above in connection with one or more further embodiments (e.g. FIGS. 1 and 5). The device 400, its individual modules and the object 440 may include one or more optional features according to the other embodiments.

FIG. 5 shows another embodiment of a device 500 for characterizing an object, wherein the object is the contents 541 of a storage container 540. The device 500 is shown both along its extension (upper part of FIG. 5) and from the front (lower part of FIG. 5).

The device 500 comprises a coil and/or a conductor loop 510 which serves as an exciter module. The coil 510 generates an alternating magnetic field.

Furthermore, the device 500 comprises an antenna and/or a receiving coil 520, which serves as a measurement module. The antenna 520 is located close to the coil 510. A computing unit 530, which serves as an evaluation module, is coupled to the antenna 520.

The storage container 540 together with its contents 541 is moved through the coil 510 by a conveyor belt 550.

If the container 540 moves due to the alternating magnetic field generated by the coil 510, the secondary field (magnetic response field) generated by the filling material 541 differs in phase and amplitude depending on the filling level and type of the filling material. For example, short screws generate a different phase position than long screws. The filling quantity influences the amplitude of the secondary field. Also the amplitude response and the phase response across the frequency of the alternating magnetic field of the coil 510 are different for different objects. From the frequency-dependent, complex secondary field of the objects, the type and quantity of the object and/or filling material 541 may be deduced.

The alignment of the filling material 541 is also reflected in the amplitude response and phase response of the secondary field. If the filling material is one single object, the alignment of the object may be determined by evaluating the complex secondary field. If the filling material 541 consists of several like objects, it may be checked, for example, whether these are aligned identically.

The complex secondary field is measured by the receiving coil 520 in the vicinity. As indicated by FIG. 5, this may be implemented, for example, in warehousing or during order picking by an inspection station. In this way, you may check, for example, whether the correct utensils are in a container or whether a subsequent delivery is necessary because the stock of a product is running low. In addition to bulk materials (such as screws), fixed objects may also be identified. The objects may be e.g. larger, partially conductive or magnetic components (e.g. replacement accumulator for an electric screwdriver). The objects to be detected must only be able to influence the secondary field in amplitude and/or phase.

By adding magnetically permeable or conductive particles to e.g. a coating, it is also possible to encode induction-independent properties such as the colour of a varnish layer.

Furthermore, it may also be determined whether the filling material 541 in the container 540 consists of different objects. For example, it may be detected whether there are screws of different lengths in the container 540.

The device shown in FIG. 5 is trained with corresponding reference objects or simulations in order to maintain a database with reference measurement values.

When the container 540 with an electrically conductive or magnetically permeable filling material 541 (e.g. screws) passes through the loop 510 through which alternating current flows, the loop 510 through which current flows generates an alternating magnetic field. The filling material 541 reacts to the primary magnetic field by induced currents or by the permeability of the material and in turn forms a secondary field. This secondary field is measured by the antennas 520 located near the current loop 510.

The material type and shape of the objects both influence the amplitude and the phasing of the secondary current. By previously measuring and/or simulating the secondary fields of different materials and objects, the computing unit 530 may now classify the objects on the basis of these measuring or simulation results, taking into account the position of the storage container 540 and/or the filling material 540. The classification may, for example, depend on the phase response of the secondary field when varying the frequency of the primary current. Since the amplitude of the secondary field measured by the antennas 520 depends mainly on the filling level of the bulk material, the amplitude response of the secondary field may also be analyzed when varying the frequency of the primary current. The higher the filling level, the higher the secondary field amplitude—the higher the secondary field measured in the antenna 520.

If a three-dimensional fingerprint of the object is required, e.g. to estimate the orientation of the object, different realizations are possible. On the one hand, the device 500 may be constructed in such a way that the object to be examined (i.e. the contents of the container 540) may be observed from different spatial angles by mechanically moving or twisting the exciter loop 510 and the measurement antenna 520. On the other hand, the spatial orientation of the primary field may also be turned purely electrically by intelligently interconnecting several coils 510 arranged orthogonally to each other. The switching complexity for this realization may here e.g. be minimized, if the position of the object to be examined, i.e. the distance between the container 540 with the object to be examined, the exciter loop 510 and the measurement antennas 520 is taken into account.

The device 500 may be used, for example, to test containers in a logistical environment by means of magnetic fields which are filled with metallic filling material. The type, quantity, composition and orientation of the filling material may thus be determined.

Figure 6:
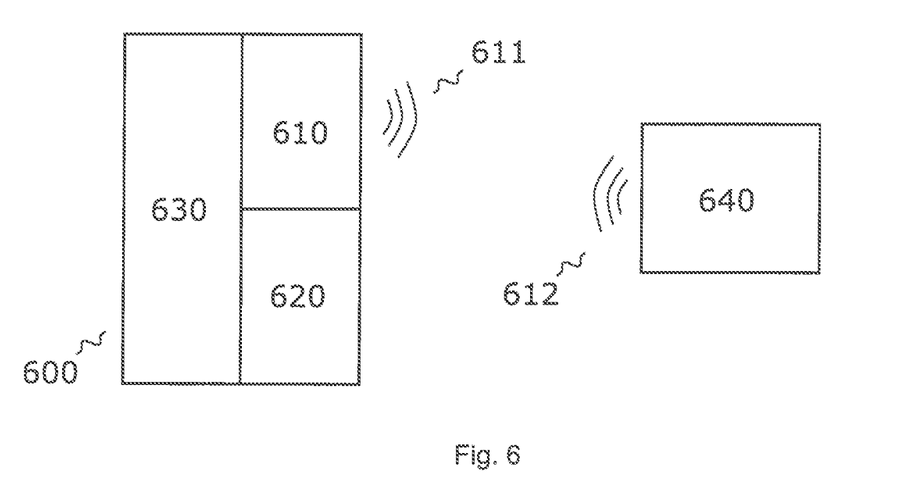
FIG. 6 shows an embodiment of a device for determining a composition of an object.

Further, FIG. 6 shows a device 600 for determining a composition of an object 640. The device 600 includes an exciter module 610 configured to generate a magnetic exciter field 611. The magnetic exciter field 611 is configured here to excite a material of the object 640 for forming a magnetic response field 612. The device 600 further comprises a measurement module 620 configured to determine at least one measurement value for the magnetic response field 612. The device 600 further comprises an evaluation module 630 configured to determine a type of material and/or a proportion of the material with respect to the object 640 based on a comparison of the at least one measurement value with reference measurement values. A type of material and/or a proportion of the material in the object 640 are assigned to each of the reference measurement values.

Different materials generate different magnetic response fields 611 in the presence of a magnetic exciter field 612. This behavior is used by the device 600 to determine/acknowledge the presence of a material in/at the object 640. In this way, the material composition of the object 640 may be determined.

The exciter module 610 may here be configured to generate the magnetic exciter field 611 according to the above described principles and develop same in its environment. Likewise, the measurement module 620 may here be configured to receive the magnetic response field 612 according to the above described principles and determine the at least one measurement value for the magnetic response field 612. The evaluation module 630 may be configured to determine the type of material and/or a proportion of the material with respect to object 640 according to the principles described above from at least one measurement value and the reference measurement values.

The exciter module 610, the measurement module 620 and the evaluation module 630 may here be configured like the exciter module 410, the measurement module 420 and/or the evaluation module 430 of the device 400 and/or generate the magnetic exciter field 611, determine the at least one measurement value of the magnetic response field 612 or compare the at least one measurement value with the reference measurement values according to the same principles. In order to avoid repetitions, reference is made to the above comments on device 400.

To determine the composition of the object 640, the position of the object 640 may optionally also be taken into account, as explained above. The position of object 640 may be determined e.g. by a measuring device (not shown) of device 600. The measuring device may here use any suitable measurement technique (e.g. laser, radar, image evaluation, etc.).

By providing the reference measurement values, to which the type of material and/or the proportion of material in the object is assigned, the material composition of the object may be determined non-invasively and in real time using the device 600.

The device 600 may be used, among other things, for testing metallic objects. For example, the composition of an alloy may be tested using the device 600. In this way, the percentage of metal or metal of a certain type and alloy may be tested.

Figure 7:
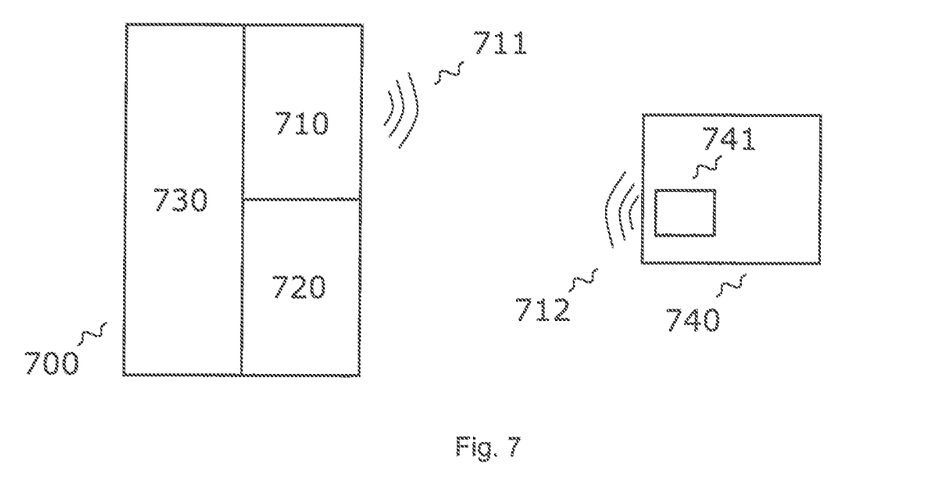
FIG. 7 shows an embodiment of a device for detecting an electrically conductive and/or magnetically permeable object in an item.

Furthermore, FIG. 7 shows a device 700 for detecting an electrically conductive and/or magnetically permeable object 741 in an item 740. The device 700 includes an exciter module 710 configured to generate a magnetic exciter field 711. The magnetic exciter field 711 is configured here to excite an electrically conductive and/or magnetically permeable object 741 in the item 740 to form a magnetic response field 712. The device 700 further comprises a measurement module 720 configured to determine at least one measurement value for the magnetic response field 712. The device 700 further comprises an evaluation module 730 configured to determine a presence of an electrically conductive and/or magnetically permeable object 741 in the item 740 based on a comparison of the at least one measurement value with reference measurement values. The reference measurement values here respectively indicate the presence of an electrically conductive and/or magnetically permeable object.

The magnetic response field 712 of the item is different in the presence or absence of an electrically conductive and/or magnetically permeable object 741 in the item 740. Accordingly, the comparison with the reference measurement value allows non-invasive and real-time determination of whether the item 740 contains an electrically conductive and/or magnetically permeable object. The device 700 thus enables simple testing for the presence of metallic objects in an item.

As indicated above, the object may be a type of food, for example. This makes it possible to check whether metal parts (e.g. from production plants) have gotten into the food during the manufacturing process. Since the device 700 enables non-invasive testing, it is also possible to test food that has already been packaged (e.g. also by a salesperson or intermediary of the food).

The exciter module 710 may here be configured to generate the magnetic exciter field 711 according to the above described principles and develop same in its environment. Likewise, the measurement module 720 may here be configured to receive the magnetic response field 712 according to the above described principles and determine the at least one measurement value for the magnetic response field 712. The evaluation module 730 may be configured to determine the presence of an electrically conductive and/or magnetically permeable object 741 in the item 740 according to the principles described above from the at least one measurement value and the reference measurement values.

To determine the presence of an electrically conductive and/or magnetically permeable object in the item 740, the position of the item 740 may optionally also be taken into account, as explained above. The position of item 740 may be determined e.g. by a measuring device (not shown) of the device 700. The measuring device may here use any suitable measurement technique (e.g. laser, radar, image evaluation, etc.).

The exciter module 710, the measurement module 720 and the evaluation module 730 may here be constructed like the exciter module 410, the measurement module 420 and/or the evaluation module 430 of the device 400 and/or generate the magnetic exciter field 711, determine the at least one measurement value of the magnetic response field 712 or compare the at least one measurement value with the reference measurement values according to the same principles. In order to avoid repetitions, reference is made to the above comments on device 400.

Embodiments of the present disclosure thus concern, among other things:

1) A system of a passive coil system which determines the filling quantity in a container by considering the secondary field;
2) A system of a passive coil system which determines the type of filling material considering the secondary field;
3) A system of a passive coil system which determines the orientation of the filling material by considering the secondary field;
4) A system of a passive coil system which determines the composition of the filling material by considering the secondary field
   a. with regard to the material characteristics of individual objects
   b. with regard to the geometric setup of individual objects c. with regard to mixing of different objects
5) A system of a passive coil system which, by observing the secondary magnetic field, detects object characteristics encoded by the admixture of permeable or conductive particles; and
6) A system of a passive coil system which detects the object to be examined three-dimensionally by considering the secondary magnetic field
   a. by mechanical rotation of the primary field generating exciter loop
   b. by changing the spatial alignment of the primary field by combining several exciter loops
   c. by also considering the distance between object and detector.

The features disclosed in the above description, the subsequent claims and the accompanying figures may be important and implemented in their various forms either individually or in any combination for the realization of an embodiment.

Although some aspects have been described in connection with a device, it is understood that these aspects also represent a description of the corresponding process, so that a block or component of a device is also to be understood as a corresponding method step or as a feature of a method step. Similarly, aspects described in connection with a method step also represent a description of a corresponding block or detail or feature of a corresponding device.

Depending on certain implementation requirements, embodiments of the invention may be implemented in hardware or in software. The implementation may be performed using a digital storage medium, for example a floppy disk, a DVD, a Blue-Ray, a CD, a ROM, a PROM, an EPROM, an EEPROM or a FLASH memory, a hard disc or another magnetic or optical memory having electronically readable control signals stored thereon, which cooperate or are capable of cooperating with a programmable hardware component such that the respective method is performed.

A programmable hardware component may be formed by a processor, a CPU, a GPU, a computer, a computer system, an ASIC, an IC, a SoC, a programmable logics element or an FPGA.

Therefore, the digital storage medium may be machine or computer readable. Some embodiments include also a data carrier comprising electronically readable control signals which are capable of cooperating with a programmable computer system or a programmable hardware component such that one of the methods described herein is performed. One embodiment is thus a data carrier (or a digital storage medium or a computer readable medium) on which the program for executing of the methods described herein is stored.

Generally speaking, embodiments of the present invention may be implemented as a program, firmware, a computer program or a computer program product having a program code or as data, wherein the program code or the data is effective to execute one of the methods when the program is executed on a processor, or a programmable hardware component. The program code or the data may, for example, also be stored on a machine-readable carrier or data carrier. The program code or the data may among others be present as a source code, machine code or byte code or any other intermediate code.

A further embodiment is a data stream, a signal sequence or a sequence of signals which may represent the program for executing one of the methods described herein. The data stream, the signal sequence or the sequence of signals may for example be configured so as to be transferred via a data communication connection, for example via the internet or another network. Embodiments thus also are signal sequences representing data suitable for being transferred via a network or a data communication connection, the data representing the program.

A program according to one embodiment may implement one of the methods during its execution for example by reading out memory locations or writing one or several data into the same, whereby possibly switching processes or other processes in transistor structures, in amplifier structures or in other electrical, optical, magnetical or other members operating according to another functional principle are caused. Accordingly, by reading out a memory location, data, values, sensor values or other information is determined, detected or measured by a program. By reading out one or several memory locations, a program may detect, determine or measure magnitudes, values, measured quantities and other information and, by writing into one or several memory locations, cause, trigger or execute an action and control other devices, machines and components.

The embodiments described above are merely an illustration of the principles of the present invention. It is understood that modifications and variations of the arrangements and the details described herein will be apparent to others skilled in the art. Therefore, it is intended that the invention is limited only by the scope of protection of the claims below and not by the specific details presented in the description and explanation of the embodiments herein.

The invention claimed is:

1. A method for determining a filling level of a storage container, comprising:
   generating a magnetic exciter field, the magnetic exciter field being configured to excite a content of the storage container to form a magnetic response field, wherein generating the magnetic exciter field comprises varying a frequency of the magnetic exciter field;
   determining at least one measurement value for the magnetic response field formed by the content in response to the magnetic exciter field; and
   determining the filling level of the storage container based on a position of the storage container and a comparison of the at least one measurement value with reference measurement values, wherein one filling level of the storage container is assigned to each of the reference measurement values,
   wherein determining the at least one measurement value for the magnetic response field further comprises:
   determining a plurality of measurement values for the magnetic response field for different frequencies of the magnetic exciter field, and
   wherein determining the filling level of the storage container further includes:
   determining a phase response and/or an amplitude response of the plurality of measurement values across the different frequencies of the magnetic exciter field; and
   comparing the phase response and/or the amplitude response of each of the plurality of measurement values across the different frequencies to a phase response and/or an amplitude response of at least a part of the reference measurement values across the different frequencies of the magnetic exciter field.

2. The method according to claim 1, wherein determining the filling level of the storage container includes:
   determining a similarity of the at least one measurement value to one of the reference measurement values.

3. The method according to claim 2, wherein determining the filling level of the storage container further includes:
   determining the filling level assigned to the reference value which has a greatest similarity to the at least one measurement value as the filling level of the storage container.

4. The method according to claim 1, wherein determining the similarity of the at least one measurement value to one of the reference measurement values comprises:
   comparing an amplitude of the measurement value with an amplitude of one of the reference measurement values; and/or
   comparing a phase of the measurement value with a phase of one of the reference measurement values.

5. The method according to claim 1, wherein determining the at least one measurement value for the magnetic response field further comprises:
   determining a plurality of measurement values for the magnetic response field for different orientations of the storage container relative to the magnetic exciter field, and
   wherein determining the filling level of the storage container further includes:
   determining the filling level of the storage container based on a comparison of the plurality of measurement values with the reference measurement values.

6. A device for determining a filling level of a storage container, comprising:
   an exciter module configured to generate a magnetic exciter field, the magnetic exciter field being configured to excite a content of the storage container to form a magnetic response field, wherein the exciter module is configured to vary a frequency of the magnetic exciter field;
   a measurement module configured to determine at least one measurement value for the magnetic response field formed by the content in response to the magnetic exciter field, wherein the measurement module is configured to determine a plurality of measurement values for the magnetic response field for different frequencies of the magnetic exciter field; and
   an evaluation module configured to determine the filling level of the storage container based on a position of the storage container and a comparison of the at least one measurement value with reference measurement values, wherein one filling level of the storage container is assigned to each of the reference measurement values, wherein the evaluation module is configured to determine a phase response and/or an amplitude response of the plurality of measurement values across the different frequencies of the magnetic exciter field and to compare the phase response and/or the amplitude response of each of the plurality of measurement values across the different frequencies to a phase response and/or an amplitude response of at least a part of the reference measurement values across the different frequencies of the magnetic exciter field.

7. The device according to claim 6, wherein the evaluation module is further configured to determine a similarity of the at least one measurement value to one of the reference measurement values.

8. The device according to claim 7, wherein the evaluation module is further configured to determine the filling level associated with the reference value which has a greatest similarity to the at least one measurement value as the filling level of the storage container.

9. The device according to claim 6, wherein the evaluation module is further configured to determine the similarity of the at least one measurement value to one of the reference measurement values based on a comparison of an amplitude of the measurement value with an amplitude of one of the reference measurement values and/or based on a comparison of a phase of the measurement value with a phase of one of the reference measurement values.

10. The device according to claim 6, wherein:
   the device is configured to move the exciter module and the measurement module relative to the storage container, or
   the exciter module comprises a plurality of coils arranged orthogonally to each other and a control circuit, the control circuit being configured to drive the plurality of coils to change a spatial orientation of the magnetic exciter field relative to the storage container;
   the measurement module is configured to determine a plurality of measurement values for the magnetic response field for different orientations of the storage container relative to the magnetic exciter field; and
   the evaluation module is configured to determine the filling level of the storage container based on a comparison of the plurality of measurement values with the reference measurement values.

* * * * *